United States Patent Office 3,358,757
Patented Dec. 19, 1967

3,358,757
WATERFLOOD PROCESS EMPLOYING MULTIPLE LIQUIDS
Billy G. Holmes, Lancaster, Tex., assignor to Mobil Oil Corporation, a corporation of New York
No Drawing. Filed Nov. 29, 1965, Ser. No. 510,392
15 Claims. (Cl. 166—9)

This invention pertains to the recovery of liquid petroleum hydrocarbons, more commonly called oil, from a subterranean formation. More particularly, it pertains to a method of recovering oil involving injecting water through an injection well into the formation to displace the oil therein so that it may be recovered from a production well leading from the surface of the earth to the formation.

Oil accumulated within a subterranean formation can be recovered, or produced, from the formation utilizing the natural energy within the formation. Because the natural energy is often inadequate or becomes depleted, a large amount of the oil is left in a subterranean formation if produced only by primary depletion, i.e., where only natural formulation energy is used to recover the oil. Where natural formation energy is inadequate or has become depleted, supplemental operations, often referred to as secondary recovery operations, are used to improve the extent of recovery of the oil. In the most successful and most widely used supplemental recovery operations, a fluid is injected through injection means, comprising one or more injection wells, and passed into the formation. Oil is displaced within and is moved through the formation, and is produced from production means, comprising one or more production wells, as the injected fluid passes from the injection means toward the production means. In a particular recovery operation of this sort, water is employed as the injected fluid and the operation is referred to as a waterflood. The injected water is referred to as the flooding water as distinguished from the in-situ, or connate, water.

Waterflooding is a useful method of secondary recovery but achieves relatively poor microscopic displacement of the oil within the subterranean formation. The relatively poor microscopic displacement is due to the property of immiscibility which the water has with the oil it seeks to displace within the formation. There is a relatively high interfacial tension between the water and the oil and, in some cases, an unfavorable contact angle made by the interface between the two liquids with the solid surface. As a result, the flooding water is unable to penetrate the micropores, or smaller pores, of the formation; and the oil in the smaller pores is not recovered. It has been suggested that surfactants be included in the flooding water to alter favorably the interfacial tension and the contact angle and thus increase the microscopic displacement of the in-situ oil. In the past, such surfactants have not been directly available at the interface between the oil phase which is being displaced within the formation and the aqueous phase which comprises the displacing liquid. Hence, the surfactants have not been as effective as they might. Further, the surfactants are adsorbed from the aqueous phase onto the surfaces of the subterranean formation, resulting in rapidly depleting the surfactant in the flooding water. To overcome these defects, it has been suggested to inject a hydrocarbon solution of an acid which will produce a soap surfactant, usually referred to simply as soap, when reacted with a caustic, followed by an aqueous caustic solution to produce the soap in situ. Such a procedure has merit but does not achieve extremely low interfacial tensions between the aqueous phase and the hydrocarbon phase and does not effect any degree of miscibility between the aqueous and the hydrocarbon phases.

It is a primary object of the invention to provide a method of carrying out a waterflood operation for recovering oil from a subterranean formation which not only produces a soap surfactant in situ but also produces the particular feature of concomitantly generating an alcohol in situ, thus creating a region of miscibility between the aqueous phase and the hydrocarbon phase, obviating the difficulties of the prior art enumerated hereinbefore, and recovering more total oil than prior art processes.

Further objects and attendant advantages of the invention will be apparent from the following detailed description.

In accordance with the invention, in a method of recovering oil from an oil-containing subterranean formation in which water is injected into an injection means and into the formation and oil is produced therefrom through a production means, the foregoing objects are accomplished by the following multistep improvement. In the first step, a hydrocarbon solution containing an acid ester is injected through the injection means and into the formation. In the second step, an aqueous solution of caustic is injected through the injection means and behind the hydrocarbon solution into the formation. In the third step, water is injected through the injection means and behind the aqueous solution of caustic and the hydrocarbon solution of acid ester into the formation.

It is a particular advantage of the invention to achieve improved results in recovering oil by employing the ester of the acid in the hydrocarbon solution whereby there is produced by a delayed, in-situ reaction an alcohol concomitantly with a soap surfactant. The mechanics and advantages of the reaction and accompanying products are described hereinafter.

In employing the invention, as the liquids are injected into the formation and move, within the formation, away from the injection means, the hydrocarbon solution of acid ester miscibly displaces the oil within the pore spaces of the formation. As is known, miscible displacement is substantially complete displacement. On the other hand, the aqueous solution of caustic immiscibly displaces the hydrocarbon solution of acid ester, slowly overrunning, intermingling therewith, and forming relatively large interfacial areas therebetween. At the interface therebetween, the caustic saponifies, under conditions of temperature and pressure existing in the subterranean formation, the acid ester to produce mutually beneficiating alcohol and soap.

The saponification is delayed because of the necessity of physically intrmingling the diverse phases in which the reactants are dissolved to produce an interface and the relatively slow diffusion of reactants to each other among the reaction products at the interface traveling, as it does, the tortuous, minute passageways and pore spaces in the subterranean formation. The alcohols produced by the saponification are solvents which posses at least partial solubility for both the aqueous phase and the hydrocarbon phase. Thus, the alcohols serve to induce increased solubility, forming a region of miscibility and a larger region of partial miscibility between the aqueous phase and the hydrocarbon phase. The soap heightens and intensifies the beneficial effect of these regions of at least partial miscibility by helping to create emulsions and lowered interfacial tension between the aqueous phase and the hydrocarbon phase. Further, the alcohol enhances the performance of the soap surfactant by holding it at the interface and minimizing the tendency to go into the aqueous phase and thence be adsorbed onto the subterranean surfaces. Finally, the water drives the aqueous solution of caustic, the products of the reactions between the aqueous solution and the hydrocarbon solution, the hydrocarbon solution, and the oil displaced within the formation toward the production means. There, the oil may be produced to the surface.

Any acid esters which will undergo saponification at the conditions of temperature and pressure of the subterranean formation may be employed in the hydrocarbon solution. Ordinarily, it is unnecessary to employ pure acid esters. The acid esters found in a number of economical sources may be employed. The primary and preferred sources are those vegetable oils which will saponify at the conditions existing in the subterranean formation. Illustrative of such vegetable oils are corn oil, peanut oil, cottonseed oil, olive oil, soybean oil, coconut oil, sunflower oil, and palm oil. Of these, the most preferred vegetable oil is corn oil.

A suitable solvent for the acid ester is provided by clean crude oil hydrocarbons or straight-run cuts of petroleum hydrocarbons, both of which should have boiling points less than about 700° F. Suitable straight-run cuts of petroleum hydrocarbons include narrow-cut light gas oil, naphtha, kerosene, raw gasoline, hexane, pentane, butane, propane, or mixtures thereof. Raw gasoline includes untreated hydrocarbon mixtures having Reid vapor pressures within the range of from 5 to 30 p.s.i. at 100° F.

The caustic which is employed in the aqueous solution is a strong caustic such as an alkali metal hydroxide or an alkali metal carbonate. Specific illustrative caustics are sodium hydroxide, potassium hydroxide, lithium hydroxide, sodium carbonate, potassium carbonate, or lithium carbonate. Preferably, sodium hydroxide is employed.

The water which is employed as the flooding water includes dilute aqueous solutions such as surface water, well water, rain water, city water, treated waste water, and suitable oil field brines.

Desirably, a concentration of acid ester in the hydrocarbon solution of from about 0.1 to about 10 percent by volume is employed. However, when vegetable oils are employed instead of purified acid ester, satisfactory results may be obtained by employing a concentration of the vegetable oils of from about 0.1 to about 10 percent by volume of the hydrocarbon solution. A concentration of at least 0.1 percent by volume is necessary to effect a concentration of soap adequate to afford appreciable lowering of interfacial tensions between the aqueous phase and the hydrocarbon phase. While concentrations greater than about 10 percent by volume may be employed, in most instances they are to be avoided as generally wasteful.

A concentration of caustic of from about 5 percent to about 40 percent by weight is employed in the aqueous solution. This concentration enables an adequate reaction rate to take place within the subterranean formation, yet prevents excessive adsorption onto the surfaces of the subterranean formation.

Any volume of the hydrocarbon solution of acid ester followed by an aqueous caustic solution will enable recovering oil in addition to that recovered by waterflood alone. As with any recovery process, it is most economically advantageous when properly engineered. For engineering considerations, the volume of the hydrocarbon solution of acid ester which should be employed is best described in terms of the effects sought to be achieved and of the hydrocarbon pore volume. The hydrocarbon pore volume is the portion of the void space, generally termed pore volume, within the subterranean formation which is occupied by the hydrocarbon phase. Desirably, a volume of hydrocarbon solution of acid ester is employed to form a flood pattern which will retain a finite but decreasing thickness as it is moved through the formation to the producing means, allowing breakthrough of the aqueous phase just as the producing means is reached. The flood pattern generally develops as an expanding cylinder which is converted to an annular cylinder by the water therebehind. The components of this flood pattern will comprise the initial hydrocarbon solution, reaction products as the aqueous solution of caustic commingles therewith, and finally a miscible region as the hydrocarbon phase and the aqueous phase are mutually dissolved in and emulsified by the reaction products. As an empirical guideline, usually a volume of hydrocarbon solution within the range of from about 0.02 to about 0.20 hydrocarbon pore volume is employed to achieve the desired effects.

The amount of aqueous solution of caustic which is employed will depend upon the amount of the hydrocarbon solution which has been injected and the concentration of acid esters therein. Generally speaking, the amount of caustic which is employed should be adequate to saponify all of the acid esters which have been injected into the formation. In general, a volume of aqueous solution of caustic of from about 0.001 to about 0.10 pore volume is employed.

The volume of water which is injected may run as high as several pore volumes. Preferably, a volume of at least 0.05 pore volume is employed. The injecting of 0.05 pore volume or more of water may be employed even when the two steps of injecting the hydrocarbon solution of acid ester and injecting the aqueous solution of caustic are to be repeated. However, the injecting of 0.05 pore volume or more of water may be delayed until the two steps are repeated if it is desired to achieve a wider band of reactants, alcohol, soap, hydrocarbon phase, miscible fluids, emulsion, and aqueous phase in advance thereof.

One cycle consisting of three basic steps may be employed. More than one cycle may be employed where desired. Usually, beyond two or three cycles the cost of employing additional cycles in the method of the invention begins to exceed the value of the additional oil recovered. The physical characteristics of the particular formation and of the in-situ oil will determine the economic feasibility of carrying out multiple cycles.

As an alternate procedure, the hydrocarbon solution of acid ester may be heated before it is injected into the subterranean formation. Also, the aqueous solution of caustic may be heated before it is injected into the subterranean formation. Usually, the saponification at the interface between the aqueous phase and the hydrocarbon phase proceeds more rapidly at higher temperatures. Thus, the step of heating the solutions tends to increase the rate of saponification at the interface between the aqueous phase and the hydrocarbon phase in the subterranean formation.

The equipment which is conventionally employed in carrying out a waterflood may be employed in carrying out the method of the invention. If heating is desired, a conventional heater may be employed to heat the hydrocarbon solution of acid ester and the aqueous solution of caustic as they are injected into the injection means, or, alternatively, a downhole heater may be employed to heat solutions in the well just before they are injected into the subterranean formation.

Further, conventional production equipment may be employed in carrying out the method of the invention. The hydrocarbon products which are produced from the production means, particularly during the latter stages of the process, may be emulsified with the aqueous phase. This emulsion may be broken by conventional heat-treating apparatus. The aqueous phase effluent from the heat-treating apparatus may be recycled to the injection means.

It can be seen from the foregoing description that the invention provides an improved method of carrying out a waterflood operation for recovering oil from a subterranean formation in which both a soap surfactant and an alcohol are produced by a delayed in-situ reaction. The soap and alcohol are mutually beneficiating in creating a region of miscibility, a larger region of partial miscibility, and a region of enhanced emulsification which enables a more nearly complete recovery of the oil from the subterranean formation. Further, the in-situ reaction produces the soap surfactant directly at the interface between the aqueous phase and the hydrocarbon phase where the soap is most efficacious in achieving lowered interfacial tensions and favorably altered contact angles between the two phases. A still further advantage of the invention is the minimizing of adsorption losses of the soap surfactant onto subterranean surfaces by the delayed reaction, by the production of the soap surfactant directly at the interface instead of in the aqueous phase, and by the enhancing effect of the alcohol.

Having thus described the invention, it will be understood that such description has been given by way of illustration and example and not by way of limitation, reference for the latter purpose being had to the appended claims.

What is claimed is:

1. In a method of recovering oil from an oil-containing subterranean formation wherein water is injected into an injection means and into said formation, and oil is produced therefrom through a production means, the improvement comprising the steps of:
    (a) injecting through said injection means a first slug of a hydrocarbon solution containing an acid ester;
    (b) injecting through said injection means a second slug of an aqueous solution of caustic; and
    (c) injecting through said injection means a third slug of water to drive said hydrocarbon solution, said aqueous solution, the reaction products thereof, and said oil toward said production means.

2. The method of claim 1 wherein said first slug of hydrocarbon solution of step (a) has a volume within the range of from about 0.02 to about 0.20 hydrocarbon pore volume.

3. The method of claim 1 wherein said first slug of hydrocarbon solution contains a concentration of acid ester within the range of from about 0.1 to about 10 percent by volume.

4. The method of claim 1 wherein said second slug of aqueous solution of step (b) has a volume within the range of from about 0.001 to about 0.10 pore volume.

5. The method of claim 1 wherein said second slug of aqueous solution contains a concentration of from about 5 to about 40 percent by weight of caustic.

6. The method of claim 1 wherein at least one of said steps (a) and (b), injecting said hydrocarbon solution containing said acid ester and injecting said aqueous solution of caustic, is repeated before said step (c), injecting said water.

7. The method of claim 1 wherein said third slug of said water has a volume of at least 0.005 pore volume.

8. The method of claim 1 wherein said steps (a), (b), and (c), injecting said hydrocarbon solution containing said acid ester, injecting said aqueous solution of caustic, and injecting said water, are repeated.

9. The method of claim 1 wherein said hydrocarbon solution employs a solvent comprising a hydrocarbon having a boiling point less than 700° F.

10. The method of claim 9 wherein said solvent comprises light gas oil, naphtha, kerosene, raw gasoline, butane, propane, or mixtures thereof.

11. The method of claim 1 wherein said hydrocarbon solution employs as solute and source of said acid ester vegetable oils which provide a soap and an alcohol when reacted with causitic under the temperature and pressure existing in the in-situ formation.

12. The method of claim 11 wherein said solute comprises corn oil, peanut oil, cottonseed oil, olive oil, soybean oil, coconut oil, sunflower oil, or palm oil.

13. The method of claim 12 wherein said solute comprises corn oil.

14. The method of claim 1 wherein said aqueous solution of caustic employs a solute comprising an alkali metal hydroxide, an alkali metal carbonate, or a mixture thereof.

15. The method of claim 14 wherein said solute comprises sodium hydroxide or sodium carbonate.

References Cited

UNITED STATES PATENTS

| | | | |
|---|---|---|---|
| 3,047,062 | 7/1962 | Meadors | 166—9 |
| 3,111,984 | 11/1963 | Reisberg | 166—9 |
| 3,111,985 | 11/1963 | Reisberg | 166—9 |
| 3,167,119 | 1/1965 | Meadors | 166—9 |
| 3,174,542 | 3/1965 | Reisberg | 166—9 |
| 3,185,214 | 5/1965 | Bernard et al. | 166—9 |
| 3,298,436 | 1/1967 | McCardell | 166—9 |

JAMES A. LEPPINK, *Primary Examiner.*

UNITED STATES PATENT OFFICE
CERTIFICATE OF CORRECTION

Patent No. 3,358,757  December 19, 1967

Billy G. Holmes

It is hereby certified that error appears in the above numbered patent requiring correction and that the said Letters Patent should read as corrected below.

Column 1, line 23, for "formulation" read -- formation --; column 2, line 50, for "intrmingling" read -- intermingling --; line 56, for "posses" read -- possess --; column 6, line 4, for "0.005" read -- 0.05 --; line 18, for "causitic" read -- caustic --.

Signed and sealed this 14th day of January 1969.

(SEAL)
Attest:

Edward M. Fletcher, Jr.
Attesting Officer

EDWARD J. BRENNER
Commissioner of Patents